July 24, 1962 B. A. HICKS 3,046,369
DEVICE FOR SENSING GAS DENSITY
Filed April 27, 1959
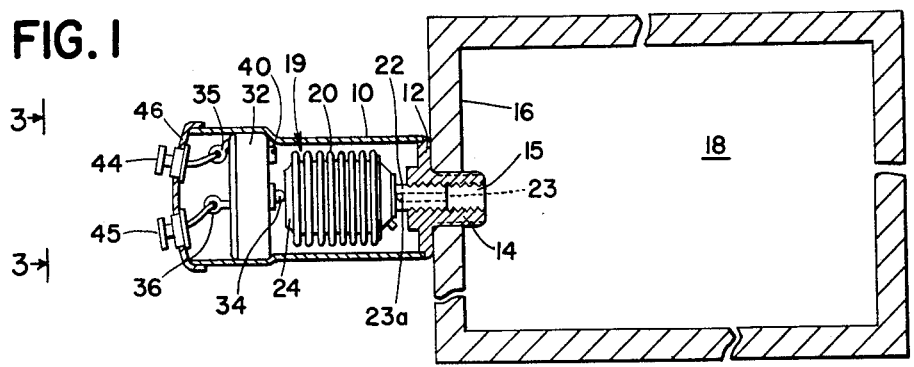
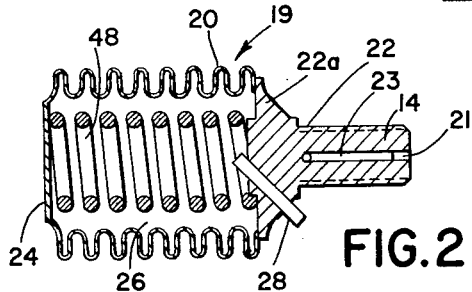
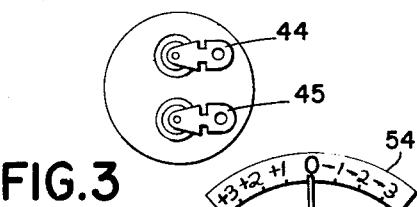
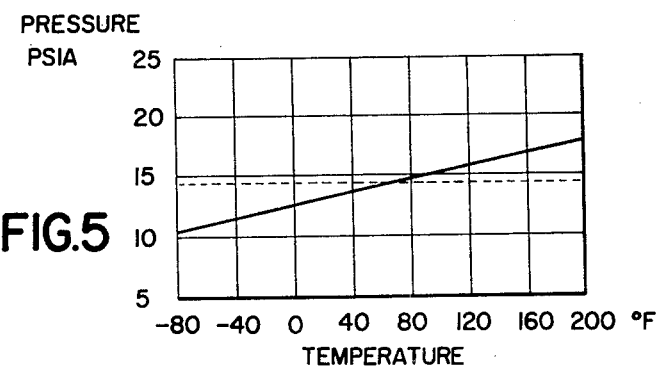
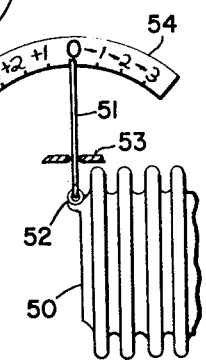
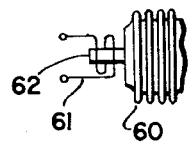
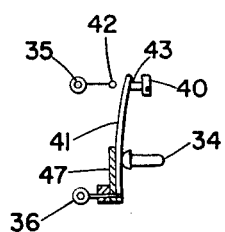
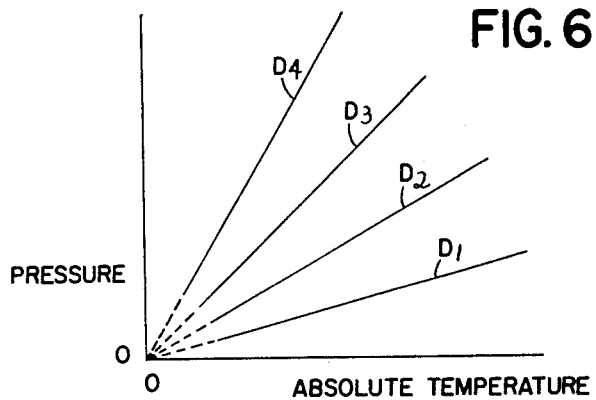

United States Patent Office 3,046,369
Patented July 24, 1962

1

3,046,369
DEVICE FOR SENSING GAS DENSITY
Beatrice A. Hicks, Upper Montclair, N.J. (% Newark Controls Co., 15 Ward St., Bloomfield, N.J.)
Filed Apr. 27, 1959, Ser. No. 809,214
3 Claims. (Cl. 200—83)

This invention relates to devices for sensing the condition of gas, and to a method for constructing the same.

One object of the invention is to provide apparatus for sensing the density of a gas, under varying conditions.

The invention provides apparatus for sensing a quantity which is inversely proportional to the temperature of a gas and dimectly proportional to its pressure, and for producing a definite response when that quantity reaches a critical value.

In one of its embodiments the invention may be applied to apparatus of the type including a bellows and a device controlled by movement of the bellows. Apparatus constructed in accordance with the invention has very important advantages in providing a means for sensing density of a gas with a high degree of accuracy, despite variations in other conditions.

Heretofore, devices including a metallic bellows have been used for various purposes, including particularly the sensing of pressure. Because variations in temperature have a tendency to affect the action of such a bellows, for example, by causing the metal to expand or contract and by affecting the spring constant of the metal, and also to affect other parts of the device, for example, the frame in which it is mounted, constructions have been employed in certain instances for counteracting or balancing out these effects of temperature on the response of the device to changes in pressure, with a view to providing a device which would sense pressure, alone, independently of temperature variations.

The apparatus of the present invention is different in very important respects from such prior apparatus. The action of the apparatus as a whole depends in a particular way on both pressure and temperature.

Thus, in one embodiment, the device is adapted to actuate a switch when a surrounding gas reaches a critical condition, that condition being a function of both temperature and pressure.

One typical application of the devices described herein is the signaling of gas leakage from closed volumes where the normal gas pressure varies with temperature. In the device, the pressure actuating point of a switch actuated by a bellows follows the pressure of the gas as it varies over a temperature range, and an indication of leakage is obtained if at any time the pressure of the gas falls below the then existing actuating point of the switch. Note that this actuating point does not correspond to a constant pressure, but instead it corresponds to a pressure value which varies with temperature. The action is such that variations in pressure of the gas within the closed volume caused by variations in temperature do not actuate the switch, but variations in pressure caused by leakage of gas from the closed volume do actuate the switch, as desired.

The device is very useful for signaling when critical gas densities are approached. For example, it may be used for signaling when the density of an electrical insulating gas approaches the danger point for electrical arc-over. The actuation point of the device varies with temperature the same as the electrical arc-over pressure does.

In one of the embodiments of the invention, there is provided a device having a flexible wall, for example, a bellows, having an interior cavity sealed against the entrance or exit of gas into or out of said cavity. This bellows is mounted with one of its ends in fixed position and the other of its ends free to move, and this movement of the bellows, when it reaches a certain point, is caused to actuate a switch or other motion-sensing device. The bellows is mounted in a region wherein it is desired to sense the density of a gas, to which the exterior of the bellows is exposed. In accordance with the invention, the bellows is constructed so that there is provided within the sealed interior cavity of the bellows a definite quantity of a particular gas. This gas is so chosen, with respect to its nature and quantity, that it gives the bellows unique operating properties. The bellows and the switch are mounted in a case or frame, and the bellows and associated components of the assembly are constructed so that, if it were not for the interior gas in the bellows, the device would respond to absolute pressure, substantially independently of variations in temperature. Stated differently, it would be temperature-balanced. However, because of the introduction of this gas, the response of the device becomes affected importantly by temperature in a particular desired manner; more particularly, it actuates the associated switch or other output element when the surrounding gas reaches a critical condition which varies in accordance with a predetermined function of pressure versus temperature. The result is that the device responds accurately to gas density under a variety of conditions.

In certain very advantageous embodiments, the gas (or other medium) sealed within the bellows follows a pressure-versus-temperature characteristic similar to that for the medium surrounding the bellows. In many arrangements, these characteristics will be substantially linear through the intended operating range; the slope of the characteristics for the medium within the bellows should for best operation be the same as that for the sensed medium.

The invention is not, in its broadest aspect, limited to arrangements in which the medium within the bellows and the medium surrounding it are entirely gaseous. In some instances, the operating range of the device, and the nature of these mediums, may be such that condensation of gas to liquid occurs simultaneously inside the bellows and outside it. Where the pressure-versus-temperature characteristics for the sensed medium includes a curved region or an abrupt departure from straightness, the characteristics for the medium within the bellows should be of similar shape.

Other features, objects and advantages will appear from the following more detailed description of an illustrative embodiment of the invention, which will now be given in conjunction with the accompanying drawings.

FIG. 1 is a longitudinal view, partly in section, of a gas density switch embodying the present invention, including a bellows which is shown in side elevation;

FIG. 2 is a longitudinal sectional view of the bellows of FIG. 1;

FIG. 3 is an end elevational view of the device of FIG. 1;

FIG. 4 is a schematic representation of a switch assembly which may be employed as a portion of the device;

FIG. 5 is a graph showing by the solid line, one illustrative characteristic which the device may be given;

FIG. 6 is a graph useful in explaining how to construct the device;

FIG. 7 is a schematic fragmentary view of an alternative embodiment in which motion of the bellows is sensed mechanically and densities are displayed on an indicator;

FIG. 8 is a schematic fragmentary view of another alternative embodiment in which motion of the bellows is sensed electromagnetically.

As used herein, the expression "density" of a gas will be understood to mean the number of mols of the gas per unit volume. It may thus be said that the apparatus described herein senses a quantity proportional to the number of molecules of the gas present per cubic centimeter of volume. If the device is used to sense the pressure within an enclosed vessel filled with some particular gas, for example, nitrogen, and if the number of molecules of the gas per cubic centimeter changes (for example, by leakage of some of the nitrogen out of the vessel), the apparatus will sense this change. So long as the composition of the gas remains unchanged, that is, in the present example, so long as it remains nitrogen, the apparatus, in sensing the number of molecules per cubic centimeter, may alternatively be regarded as sensing the weight of the gas per unit volume, because the two quantities are proportional to one another.

Hence the apparatus senses gas density, in the sense that it senses the number of molecules per unit volume, and in many but not all of its possible applications it may be regarded as also sensing the weight per unit volume.

If, on the other hand, the composition of the gas should change, as, for example, by the leakage of another gas of a different molecular weight into the vessel, the result would be that the apparatus would continue to sense a quantity proportional to the number of molecules per unit volume, but now this quantity would no longer be proportional to the weight per unit volume of the original gas.

This explanation is offered here to make clear the respect in which the apparatus senses gas density.

As one example of the usefulness of the device, the chamber 18 of FIG. 1 may represent a chamber including electrical components subjected to voltages which might produce an arc from one component to another, except that the chamber is filled with a gas, for example, nitrogen, maintained at a predetermined density. Typically this gas is at a superatmospheric pressure. If a leak should develop in the wall of the chamber 18, so that the gas escapes from it, it is possible that the gas density might drop to a low enough value to permit arcing, with resulting malfunctioning of the electrical apparatus and dangerous consequences. The device herein described, among its various uses, is capable of actuating an alarm if such leakage should occur, so that the undesirable condition may be remedied. Moreover, it is free from any tendency to produce a false alarm because of a drop in pressure which is produced by a drop in temperature rather than leakage. The device may of course be used in a wide variety of other applications.

In FIG. 1 the device adapted to serve as a gas density switch comprises a tubular case 10, fitted at one end with a base 12. This base is provided with a projecting stem 14, of circular cross section, the stem having external threads and also a cylindrical bore 15 with internal threads. For mounting the device, the stem 14 may be screwed into a threaded opening in a wall 16 of the chamber 18 including the gas the density of which is to be sensed.

Within the case 10 there is provided a hollow metallic bellows 19, of circular cross section. The side walls 20 of the bellows are of corrugated configuration, as shown in FIGS. 1 and 2. At one end, these side walls are mounted on and sealed to an enlarged portion 22a of a stem 22 which serves as an end wall of the bellows. This stem is threaded into the bore 15 and thus serves to support the bellows and to maintain one of its end walls stationary. The end of the stem 22 is slotted at 21 so that a screw driver, inserted through the end of the bore 15, may be employed to adjust the position of the bellows longitudinally of the case. Such an adjustment is employed in order to position the bellows at the optimum point with respect to a switch (yet to be described) which it actuates. Moreover, this adjustment is a factor in determining the operating characteristic of the system.

The left-hand or free end of the bellows is sealed by an end wall or cap 24 of smooth, flat configuration. The exterior and interior walls of this cap are perpendicular (within say plus or minus 2 degrees) to the longitudinal axis of the device.

The side walls 20 of the bellows 19 are affixed to and sealed to its end walls 22a as, for example, by brazing, so as to form within the bellows a cavity 26.

The stem 22 is provided, toward its right-hand end, with an axial bore 23, which communicates with a radially extending bore 23a.

Communication is thus established from the interior of the chamber 18, through the right-hand portion of the bore 15, through the longitudinally extending bore 23, through the radially extending bore 23a, to the region which is within the tubular case 10 and which surrounds the bellows 19. In this way, the condition of the gas surrounding the bellows is the condition of the gas within the chamber 18.

The end wall 22a has a filling tube 28 extending through it, as shown in FIG. 2. Initially, the free end portion of the tube is longer than shown in FIG. 2, and it forms a conduit from the exterior of the bellows to its interior cavity. During construction of the device, first the bellows is evacuated through this tube; then a predetermined amount of a selected gas in introduced into the bellows through this tube, under controlled conditions, and the tube 28 is then sealed. To seal the tube it is squeezed tightly shut at a point on the outer side of the end wall 22a, so as to block the passage of gas, is then severed, by cutting it at a point just beyond (to the right of) the point where it is squeezed shut, and then it is permanently sealed, at its end, as by soldering. The sealing of this tube completes the sealing of the bellows against the entrance or exit of gas.

The left-hand end of the case 10 has a region of enlarged diameter, thereby providing an internal shoulder-like portion. A switch assembly 32 is pressed into the case, up against this shoulder-like portion, as shown. It is affixed in position, as by soldering or cementing.

The switch assembly 32 may, itself, be mostly of conventional construction, and may be provided with an actuating button 34, and terminals 35 and 36. In addition to the terminals 35 and 36, which are shown in FIG. 1, as connected respectively to control terminals 44 and 45, the switch assembly may also be provided with another terminal 40, which may, if desired, be used in some control circuits. A schematic representation of the switch assembly is shown in FIG. 4. The switch includes a movable member 41, one end of which is connected to the terminal 36, and the other end of which is adapted to engage, alternatively, either a terminal 42 or a terminal 43. The terminal 42 is connected to the terminal 35 and the terminal 43 is connected to the terminal 40. The movable member 41 is constructed and mounted so that, in the absence of pressure from the button 34, it is normally urged toward one of the cooperating terminals, in this example, the terminal 42, and is adapted, under the action of pressure from the button 34, to transfer quickly, by snap action, to the other of these terminals, 43. One way of describing the member 41 is to say that it is dished in shape, and inverts under pressure. Its action is roughly similar to that of a Belleville type spring. Switches including snap-action members like 41 are known, per se.

It may be seen that, when the bellows is in a relatively contracted position, a circuit is established between the terminals 35 and 36, by the member 41. When the bellows expands far enough (as it does in the event of leakage of gas from the chamber 18) this circuit is interrupted, by the snap action motion of the upper end of the member 41. If the bellows thereafter contracts sufficiently, the member 41 returns to its contact 42 and re-establishes the circuit between the terminals 35 and 36. In the arrangement shown in FIG. 1, only the terminals 35 and 36 are employed, these being connected respectively to terminals 44 and 45, carried by a cap 46, which is fitted tightly on the left-hand end of the case, and soldered in position, and is adapted to provide a gas tight seal for the case in this region. It may be assumed that the terminals 44 and 45 are connected to an alarm circuit, adapted to acuate an alarm when expansion of the bellows beyond a critical point causes the switch to break the circuit between the terminals 45 and 44. The terminal 40 is available for use, if desired. When the bellows contracts beyond a critical point the switch establishes ("makes") a circuit between the terminals 35 and 36, and hence between the terminals 44 and 45, and, if desired, in various other uses of the device, a suitable output circuit connected to these terminals may thus be actuated to indicate a rise in the density of the gas being sensed.

In some embodiments, as illustrated in FIG. 2, the bellows is provided on its interior with a spring, under compression, which cooperates with the spring action of the side walls in tending to expand the bellows when the pressure on the outside of the bellows decreases. Thus in FIG. 2 there is shown a coiled spring 48 arranged axially of the bellows. Throughout the range of operation of the bellows, the spring is under compression, and this compression is great enough to hold it in place.

After the sensing devices have been made, and before they are installed in position where they are to sense the density of a gas, situations may arise in which the pressure on the inside of the bellows might be so much greater than the pressure on the outside of the bellows that the bellows would tend to expand so much that the device would be damaged, if provision to the contrary were not made. Thus, assume the bellows has been filled with a gas, under certain temperature and pressure conditions, and assume further that the bellows is intended for use for sensing the density of gases under relatively high pressure. Before installation, high pressure outside gas will not be present to tend to balance the effect of the gas on the inside of the bellows. If the bellows is subjected to a relatively high temperature for some reason, the inside gas may cause it to have an abnormal tendency to expand. It might, under some condition, tend to expand beyond the elastic limits of the bellows. Under some circumstances it might damage the switch. To prevent such difficulties, there is provided, in the path of the bellows, a stop member, which prevents it from expanding beyond a certain point. In the arrangement illustrated in FIGS. 1–4, the stop member may conveniently be made a part of the switch assembly. Such a member, 47, is shown on the left-hand side of the member 41. The member 47 may be of a rigid plastic, fixed in position, by attachment to the case of the switch assembly. When the bellows has expanded a certain distance, the member 47 checks the motion of the member 41 which checks the motion of the member 34 which checks the motion of the bellows, as desired.

As an illustration of the manner of constructing a gas density device for a particular use, let it be assumed that the gas in the chamber 18 is nitrogen. Assume further that it is desired that that gas density be equal to or greater than a critical value, for example, .00256 pound mol per cubic foot. The apparatus is to be designed so that the switch will maintain a circuit between the terminals 44 and 45 only so long as the density is equal to or greater than that critical value, and if the gas density within the chamber 18 should fall below that critical value, it is desired that the switch interrupt the circuit between those terminals. The device is to operate so that, despite changes in temperature to which the chamber and the bellows may be subjected, the actuating point of the device should still represent the same number of molecules per cubic centimeter.

The desired action of this illustrative apparatus may be further explained with reference to the graph shown in FIG. 5. To have the desired action, the critical actuating point of the apparatus varies as shown by the solid line slanting upwardly from left to right in this graph. That is, for a temperature of, say 70° F., it is desired that the bellows cause the switch to open the circuit when the pressure drops below what is here shown as about 14.5 pounds per square inch. For higher temperatures, a higher actuating pressure should be provided, and for lower temperatures, a lower actuating pressure should be provided, as shown by this solid black line.

In constructing such apparatus, a bellows assembly is employed having the operating characteristic that, if the bellows were sealed in a highly evacuated condition (without the insertion of any gas), it would have a characteristic generally like the one shown by the horizontal broken line in FIG. 5. That is, the bellows assembly is so constructed that, if there were no gas in the bellows, its expansion and contraction (with respect to a reference point in the case, for example the button 34) would be dependent on the external pressure alone, and not the temperature. Consequently it would cause the switch to operate on a substantially constant pressure, such as that indicated by the broken line. Such an assembly may be referred to as "temperature-balanced." The representation in FIG. 5 illustrates the point that, to a first approximation, the bellows assembly, without gas in the bellows, would actuate on a relatively constant pressure despite changes in temperature.

By way of further explanation of what is involved in a temperature-balanced system, it may be pointed out that variations in temperature cause expansion and contraction of the matter of which the various portions of the assembly are made, including such portions as the case 10, the switch case 32, the stem 22, the bellows and the button 34. If the expansion of the case is, for example, greater than that of the material of the bellows and the stem, a temperature error will be produced. This is a possible source of major error, if provision is not made against it. To prevent this, the materials of the various parts are so chosen that the net effect (from causes such as those referred to above) of temperature on the distance of the end wall 24 from some reference point, say, the member 12, is balanced out by a similar expansion or contraction of the other members of the assembly, such as the case 10, etc. Also, the bellows is made of a material having a sufficiently constant Young's modulus of elasticity to prevent temperature variations from producing errors of intolerable magnitude from this source. Some satisfactory bellows devices may be made from an age-hardening nickel-ferrous alloy, for example, that sold by International Nickel Company under the trademark Inconel-X, or from the alloys designated by that same company as "Ni-Span," such as "Ni-Span-C."

Before proceeding with further explanation of the method, it is convenient to explain here what is shown in FIG. 6. This figures illustrates, by the curves (lines) $D_1$, $D_2$, $D_3$ and $D_4$ the fact that the pressure of a gas, in an enclosd chamber, varies with the absolute temperature along a characteristic which, for a very considerable range, may be substantially linear, but an important factor is that the slope of this characteristic varies with the density of the gas. The line $D_1$ is for a gas of rather relatively low density and the lines $D_2$, $D_3$ and $D_4$ show the characteristics for that same gas, for successively higher values of density (molecules per unit volume).

It will be understood that the procedure is one in which the bellows is first evacuated, and thereafter filled with a gas, under such conditions that the pressure-temperature characteristic of this gas inside the bellows will have the same slope as the pressure-temperature operating characteristic desired for the apparatus, as shown in FIG. 5. From study of FIG. 6 it may be seen that a key factor in controlling this slope is the control of the density (molecules per unit volume) of the gas within the bellows, and this in turn may be controlled by controlling the pressure and temperature of that gas when filling the bellows.

As has been explained previously, the pressure of a gas obeying the Perfect Gas Law is proportional to the product of the density and the absolute temperature.

The over-all operating characteristic of the apparatus described herein may, in the illustrative embodiment now under consideration, be written:

Pressure=density×temperature+Δ*p*.

The pressure here, in the case of the embodiment illustrated in FIG. 1, is the pressure (of the sensed gas in the chamber 13) at which the switch is actuated. The temperature is that of the gas in the chamber 18 and within the case 10. (It may be assumed that this is the same as the temperature of the gas in the bellows.) In the above equation the quantity Δ*p* is an increment of pressure representing an amount by which the graph may be translated upwardly or downwardly, for example, to provide an alarm with a margin of safety before the density has dropped to the critical value. For example, as it is important to maintain in the chamber 18 a certain density, corresponding to a certain pressure-temperature characteristic, if the quantity Δ*p* has a value of +2, this would give an alarm at two pounds per square inch absolute above that characteristic.

Assume that for a given use of the device it is specified that the alarm is to be actuated under a first condition represented by pressure and temperature conditions $P_1$ and $T_1$, or under a second condition represented by pressure and temperature conditions $P_2$ and $T_2$.

Study will show that by substituting these values of pressure and temperature in the above equation, the quantities of density and Δ*p* may be determined. The determination of the density quantity determines which of the density graphs in FIG. 6 will be employed in determining the pressure and temperature conditions for the filling of the bellows.

Further details will now be considered of the method of constructing the apparatus having a desired characteristic, for example one in which an alarm will be actuated when the density in the chamber falls so much that, at the exciting temperature, the pressure is below the corresponding value indicated by the graph in FIG. 15. The bellows is first evacuated by pumping (to say a pressure of 50 microns) and there is then inserted into the bellows a quantity of a gas having pressure-temperature gas law properties like that of the gas in the chamber 18. The same gas as that in the chamber 18 may be used in the bellows. As another example, if the gas in the chamber is nitrogen, air may be used in the bellows.

The pressure and temperature of the device, and of the gas thus inserted, is taken into account in the following manner: The gas and the bellows may, before this filling operation, conveniently be allowed to reach room temperature. This temperature is noted. Reference is then made to the graph representing the desired characteristic, as shown in FIG. 5, and the pressure value is read off the graph which corresponds to the common temperature of the various components (bellows, gas to be inserted in the bellows, room temperature, etc.). For example, at a temperature of, say, 70° F., the pressure would be read off as 14.5 pounds per square inch absolute. The bellows is then filled with gas at this temperature and at this pressure. Stated differently, the inside of the bellows is filled with a gas at a temperature and pressure corresponding to a desired point on the operating characteristic. Provided the gas has been chosen so that it follows a gas law characteristic corresponding to that for the medium surrounding the bellows, the over-all operation of the device assembled and adjusted as herein described will then be correct. The filling tube 28 is then sealed in the manner which has been described. The bellows is then mounted in the case 10 by screwing its stem into the bore 15. Thereafter, the switch assembly 32 is pressed in, and the cap 47 attached. In one convenient mode of constructing the apparatus, the terminals 44 and 45 may include small glass tubes passing through, and bonded to the metallic structure of the cap.

The wires from the terminals 35 and 36 are first stripped of insulation near their ends, and are passed through these tubes. Then the cap 47 is placed on the case and soldered in position. Thereafter these wires are drawn taut, and with solder a hermetical seal is completed around these wires in the region of the terminals 44 and 45, so that the entire case is now sealed.

After assembly of the components in the case, the longitudinal position of the bellows with respect to the switch is adjusted by turning it, with the aid of a screw driver inserted into the slot 21, through the bore 15. By this adjustment, the bellows is so positioned in relation to the switch that when the gas in the chamber 18 reaches a critical density the bellows will open the switch.

A margin of safety may be provided by positioning the bellows, with the aid of the screw driver adjustment, so that it actuates the switch when the density drops to a value slightly higher than the one which would produce arcing.

In one very satisfactory arrangement, the apparatus is adjusted so that the bellows opens the switch when the pressure and temperature of the gas on the exterior of the bellows equals the pressure and temperature of the gas on the interior of the bellows. This type of action will be outlined if the pressure and temperature of the gas with which the bellows is filled corresponds to a point on the desired switch actuating characteristic of the apparatus, and if the screw driver adjustment is employed to cause the bellows to actuate the switch (open the connection at the contact 42) when gas is applied (through the stem 14) to the region surrounding the bellows at a pressure and temperature corresponding to a point on the desired the desired switch-actuating characteristic.

In an alternative arrangement which is also very satisfactory, the switch-actuating characteristic for the device may be one which is parallel to and displaced from the characteristic which represents the variation of pressure-versus-temperature of the gas within the bellows. Suppose, for example, the desired switch actuating characteristic is one which lies say, two pounds per square inch above the one shown in FIG. 5. In one satisfactory arrangement, the bellows may be filled with gas in the same manner as described previously, say at 70° F. and 14.5 pounds per square inch, this corresponding to a point on the characteristic shown in FIG. 5. Then, by the screw driver adjustment, and by applying gas of the type to be sensed, of controlled temperature and pressure, to the interior of the case 10 through the stem 14, the bellows may be caused to actuate the switch at the desired pressures two pounds per square inch above those shown in FIG. 5. In this embodiment, the switch actuating characteristic would be parallel to that shown in FIG. 5, but defined by a line two pounds per square inch higher. Note that in this embodiment, when the switch is actuated, the pressure on the outside of the bellows is slightly higher than the pressure on the inside of the bellows.

In any event, where the device is being used to maintain a density which will prevent arcing between electrical components in the chamber 18, the device is constructed and adjusted to have the switch-actuating characteristic lying above the values which actually permit arcing under the electrical conditions existing, thereby providing a margin of safety.

It will be understood that in some other uses of the device, it may be desirable to employ the screw driver adjustment to shift the switch-actuating characteristic to a position below the characteristic corresponding to what is represented by the solid line in FIG. 5, rather than above.

Purely for purposes of further illustration of arrangements useful for maintaining various values of gas density, the following typical conditions for filling the bellows are given:

| Pressure, p.s.i.a. | Temperature, ° F. | Gas Density, lb. mols/ cu. ft. |
|---|---|---|
| 5.3 | 70 | .00093 |
| 10.6 | 70 | .00186 |
| 15.9 | 70 | .00279 |
| 21.2 | 70 | .00372 |

It will be understood that these different examples represent different arrangements in which different values of gas density are to be sensed and maintained.

A variety of gases may be used in the bellows, depending upon the nature of the gas to be sensed, and the desired operating characteristic. Among illustrative gases which may be used in various circumstances are air, nitrogen, helium, argon, sulphur hexafluoride and fluorochemicals. The law of operation of the device will depend upon the pressure-temperature characteristic of the gas with which it is filled. At low pressures and moderate to high temperatures permanent simple gases such as nitrogen, argon, helium, air, essentially follow the linear Perfect Gas Law. At high pressures, about 5 to 10 atmospheres, they start to deviate substantially from the Perfect Gas Law, and pressure varies non-linearly with temperature. At saturation temperatures and at low temperatures the characteristic also varies from the Perfect Gas Law. This is due to volume and intermolecular effects due to the mass and attractive forces of the molecules. In typical constructions of the device described herein, the pressure-temperature characteristic of the medium within the bellows should match that of the surrounding medium, and this can most easily be accomplished by filling it with the same type medium.

In some cases the gas being sensed will have molecules which associate or dissociate. If the use of the device is such that it is desired that the association or dissociation of the molecules of the gas being sensed be ignored, as for example in the case of leak detection, then the bellows should be filled with a gas whose molecules associate or dissociate in the same manner and thereby follow the nonlinear temperature-pressure relationship of the gas being sensed.

As stated before, the apparatus may be used under some circumstances in which the gas being sensed condenses, in a certain temperature range. For this use, if a warning signal is to be given only when leakage occurs, the bellows should be filled with a gas having the same condensation characteristics as the gas being sensed. Condensation will then occur simultaneously on both sides of the wall of the bellows, and the contents of the bellows will follow the same non-linear temperature-pressure relationship as that of the gas being sensed.

In some cases, the bellows may be filled with a mixture of two mediums, one which, in the operating range, is always gas, and one which condenses. For example, one medium may be sulphur hexafluoride which remains a gas in the range of operation. The other medium may comprise fluorochemicals, for example, Minnesota Mining and Manufacturing Company's product known as FC75 or FC43 or a mixture of them. The fluorochemical FC75 is believed to be a completely fluorinated cyclic ether with the empirical formula $C_8F_{16}O$. The fluorochemical FC43 is heptacosafluorotributylamine having the structure (but not the properties) of tertiary amines and the formula $(C_4F_9)_3N$.

However, if the desired arrangement is one in which a warning signal is to be produced when the density of the gas being sensed goes down, as it will at the time of condensation, or up at the time of evaporation, then the bellows is filled with a gas which does not undergo this condensation. For example, in sensing FC75 fluorochemical, the bellows could be filled with air.

It will be noted that the embodiments illustrated in the drawings are of the type in which the sensing device comprises a bellows and the motion of the end wall in an axial direction is caused largely by corresponding motion of portions of the flexible side wall of the device. In a variation, the side wall may be made relatively rigid (in which case it need not be of corrugated configuration) and the end wall may be flexible, being of the nature of a diaphragm. In that variation the sensing device, comprising an enclosed, sealed, chamber having a diaphragm mounted in one wall, responds by flexing of the diaphragm. The conditions which have been described regarding the quantity of gas inserted into the interior of the device would also apply here.

The invention is not, in its broadest aspect, limited to arrangements in which the expansion and contraction of the gas filled device serves to actuate a switch. Instead, this motion may be indicated on a scale. Thus, in FIG. 7 there is shown a bellows 50 to which a pointer 51 is pivotally attached at a bearing 52. The pointer 51 passes through a stationary pivot or bearing 53, and its outer end is adapted to move, with respect to a scale 54, so as to indicate the motion of the bellows. In a variation, the gas filled device, instead of taking the form of a bellows, may take the form of a Bourdon tube, the motion of which is indicated on a scale.

In still another variation, illustrated in FIG. 8, there may be provided a bellows 60, carrying on its end a core 62 of iron or other electromagnetically sensitive material, and motion of this core is sensed, as with the aid of a stationary coil 61. Motion of the bellows shifts the core 62, and, with an iron core, this motion varies the inductance presented to the terminals of the coil 61. This variation in the value of this inductance may be employed to control suitable inductance-responsive indicating or control circuits connected to the coil. Other electromagnetic motion sensing arrangements may alternatively be employed. For example, the core attached to the bellows may be of semiconductor material having the property that its resistance varies when it is exposed to a magnetic field of varying strength. Thus the coil may be employed to produce a magnetic field, and when the core is shifted with respect to the coil, the result is to cause the electrical resistance of the core to vary. This variation in resistance is an indication of the motion of the bellows and may be sensed, as by leads attached to the opposite sides of the core.

Thus it will be seen that, for sensing the density of a gas such as that in the chamber 18, there may be employed gas filled devices of the types illustrated in FIGS. 1, 7 and 8, or variations thereof, having the characteristics which have been described at some length in this application, and the motion of the expansion and contraction of such devices may be sensed in a variety of ways for indicating and control purposes.

It will be understood that, in this specification and in the claims to follow, the expression "a gas" is broad enough in its meaning to include a mixture of gases.

While illustrative forms of the invention have been disclosed in considerable detail, it will be understood that various changes may be made in the construction and arrangement of the several parts without departing from the general principles and scope of the invention as defined by the appended claims.

I claim:

1. In a density sensing system, a chamber containing a gas the density of which is to be sensed, a hollow case mounted so that its interior cavity is in communication with said chamber, a sealed expansible and contractible bellows mounted within said case so that the exterior of said bellows is in communication with the gas contained in said chamber, said bellows and said case being constructed of materials having balanced temperature coefficients of expansion, said bellows having an interior cavity filled with a gas, output means, said bellows having an actuating portion positioned to actuate said output means when said bellows moves to a critical position, the gas within said chamber having a predetermined pressure-versus-temperature function, said bellows being filled with a predetermined quantity of gas having a pressure-versus-temperature function such that, with variations in temperature, the gas within said bellows varies in pressure in accordance with its pressure-versus-temperature function which is at all times matched in slope to that of the gas in said chamber, thereby causing said bellows to actuate said output means at different pressures of the sensed chamber gas, under varying temperature conditions, but so as to actuate said output means at a critical density condition of the gas within said chamber.

2. Apparatus according to claim 1 in which the said interior cavity of said bellows contains a plurality of components, one of which remains gaseous throughout the operating range of said device, and the other of which is gaseous in a portion of the said operating range and is liquid in a portion of the said operating range.

3. Apparatus according to claim 1 in which said output means comprises a switch, and the said actuating portion of said bellows actuates said switch at a critical position in which the pressure of the gas within said bellows is approximately equal to the pressure of the gas contained in said chamber and in said hollow case.

References Cited in the file of this patent
UNITED STATES PATENTS

| | | |
|---|---|---|
| 313,892 | Scollay | Mar. 17, 1885 |
| 1,354,069 | Terhaar | Sept. 28, 1920 |
| 1,541,929 | Eggleston | June 16, 1925 |
| 2,094,319 | Faust | Sept. 28, 1937 |
| 2,247,277 | Cid | June 24, 1941 |
| 2,484,207 | Criner et al. | Oct. 11, 1949 |
| 2,520,660 | Sedwick | Aug. 29, 1950 |
| 2,522,596 | Bevins | Sept. 17, 1950 |
| 2,545,107 | Peper | Mar. 13, 1951 |
| 2,631,024 | Beardsley | Mar. 10, 1953 |
| 2,718,780 | Swain | Sept. 27, 1955 |
| 2,884,844 | Sellers | May 5, 1959 |
| 2,989,863 | Camilli et al. | June 27, 1961 |

UNITED STATES PATENT OFFICE
CERTIFICATE OF CORRECTION

Patent No. 3,046,369　　　　　　　　　　　　　　　July 24, 1962

Beatrice A. Hicks

It is hereby certified that error appears in the above numbered patent requiring correction and that the said Letters Patent should read as corrected below.

Column 1, line 14, for "dimectly" read -- directly --; column 2, line 45, for "characteristics" read -- characteristic --; column 5, line 4, for "acuate" read -- actuate --; line 30, after "assume" insert -- that --; column 6, line 54, for "enclosd" read -- enclosed --; column 7, line 41, for "FIG. 15" read -- FIG. 5 --; column 8, line 28, for "outlined" read -- obtained --; line 36, strike out "the desired", second occurrence.

Signed and sealed this 4th day of December 1962.

(SEAL)
Attest:

ERNEST W. SWIDER
Attesting Officer

DAVID L. LADD
Commissioner of Patents